(12) United States Patent
Raj et al.

(10) Patent No.: US 12,050,485 B2
(45) Date of Patent: Jul. 30, 2024

(54) POST-MANUFACTURE LATCH TIMING CONTROL BLOCKS IN PIPELINED PROCESSORS

(71) Applicant: GlobalFoundries U.S. Inc., Malta, NY (US)

(72) Inventors: Vivek Raj, Bangalore (IN); Sunil Kumar, Bangalore (IN); Shivraj G. Dharne, Bangalore (IN); Mahbub Rashed, Cupertino, CA (US)

(73) Assignee: GlobalFoundries U.S. Inc., Malta, NY (US)

( * ) Notice: Subject to any disclaimer, the term of this patent is extended or adjusted under 35 U.S.C. 154(b) by 245 days.

(21) Appl. No.: 17/726,171

(22) Filed: Apr. 21, 2022

(65) Prior Publication Data

US 2023/0341888 A1    Oct. 26, 2023

(51) Int. Cl.
*G06F 1/10*    (2006.01)
*G06F 9/38*    (2018.01)
*G06F 15/78*   (2006.01)

(52) U.S. Cl.
CPC ............ *G06F 1/10* (2013.01); *G06F 15/7839* (2013.01)

(58) Field of Classification Search
CPC ........... G06F 1/10; G06F 15/7839; G06F 9/38
See application file for complete search history.

(56) References Cited

U.S. PATENT DOCUMENTS

| | | | |
|---|---|---|---|
| 5,896,299 A | 4/1999 | Ginetti et al. | |
| 6,407,602 B1 | 6/2002 | Radjassamy | |
| 6,532,574 B1 * | 3/2003 | Durham | G06F 30/327 716/113 |
| 7,278,126 B2 | 10/2007 | Sun et al. | |
| 7,581,201 B2 | 8/2009 | Kazda et al. | |
| 7,772,889 B2 | 8/2010 | Naffziger | |
| 8,316,340 B2 | 11/2012 | Chen | |
| 2014/0019815 A1 * | 1/2014 | Bull | G06F 11/0721 714/E11.143 |

(Continued)

FOREIGN PATENT DOCUMENTS

CN    114765455 A  *  7/2022

OTHER PUBLICATIONS

Kamakshi et al., "A Post-Silicon Hold Time Closure Technique Using Data-Path Tunable-Buffers for Variation-Tolerance in Sub-Threshold Designs," IEEE, 19th International Symposium on Quality Electronic Design (ISQED), 2018, pp. 341-346.

(Continued)

*Primary Examiner* — Jaweed A Abbaszadeh
*Assistant Examiner* — Gayathri Sampath
(74) *Attorney, Agent, or Firm* — David Cain; Hoffman Warnick LLC

(57) ABSTRACT

An apparatus includes a series of pipeline stages that have logic components connected to supply output data to latch components, timing correction blocks connected to the latch components, and a memory component connected to supply a correction pattern to the timing correction blocks. The timing correction blocks have a buffer connected to a multiplexor. The correction pattern controls whether the multiplexor receives an adjusted clock signal through the buffer to control whether the timing correction blocks supply an unadjusted clock signal or the adjusted clock signal to the latch components.

20 Claims, 7 Drawing Sheets

(56) References Cited

U.S. PATENT DOCUMENTS

2021/0265986 A1* 8/2021 Schat ................ H03K 3/0375
2021/0382518 A1* 12/2021 Uytterhoeven ........ H03K 5/135

OTHER PUBLICATIONS

Das et al., "RazorII: In Situ Error Detection and Correction for PVT and SER Tolerance," IEEE Journal of Solid-State Circuits, vol. 44, No. 1, 2009, pp. 32-48.
Tsai et al., "A Yield Improvement Methodology Using Pre- and Post-Silicon Statistical Clock Scheduling," IEEE, 2004, pp. 611-618.
Nagaraj et al., "A Study on Placement of Post Silicon Clock Tuning Buffers for Mitigating Impact of Process Variation," EDAA, 2009, pp. 1-4.
Seo et al., "Post-Silicon Tuning Based on Flexible Flip-Flop Timing," Journal of Semiconductor Technology and Science, vol. 16, No. 1, 2016, pp. 1-12.

* cited by examiner

POST-MANUFACTURE LATCH TIMING CONTROL BLOCKS IN PIPELINED PROCESSORS

BACKGROUND

Field of the Invention

The present disclosure relates to pipelined processors and more specifically to post-manufacture latch timing control blocks used in pipelined processors.

Description of Related Art

Within pipelined processors, a timing constraint is a way to specify a delay between nodes. A clocked logic gate is one which performs its function subsequent to the assertion (or deassertion) of a clock signal. For example, some logic gates (e.g., some static logic gates) receive a clocked enable signal and cannot perform their intended functions until the enable signal is asserted. The interdependence of the clocked logic gates requires an orderly and timely progression of data. Absent an orderly and timely progression of data through a logic pipeline data flowing through clocked logic gates is likely to be corrupted.

Setup time is the amount of time a signal is required to remain stable at a data input of a sequential cell before the arrival of a clock edge. Hold time is the amount of time the signal is required to remain stable at the sequential cell input after the arrival of the clock edge. If the delays through the logic cells are too long, then the signals may violate setup time requirements. Conversely, if the delays through the logic cells are too short, then the signals may violate hold time requirements.

SUMMARY

According to one embodiment herein an apparatus includes a series of pipeline stages that have logic components connected to supply output data to latch components, timing correction blocks connected to the latch components, and a memory component connected to supply a correction pattern to the timing correction blocks. The timing correction blocks have a buffer connected to a multiplexor. The correction pattern controls whether the multiplexor receives an adjusted clock signal through the buffer to control whether the timing correction blocks supply an unadjusted clock signal or the adjusted clock signal to the latch components.

Other embodiments herein include an apparatus that has a series of pipeline stages. Each of the pipeline stages includes logic components connected to receive input data and latch components. The logic components are connected to supply output data to the latch components. Additionally, the pipeline stages include timing correction blocks connected to the latch components. Further, the apparatus includes a memory component that is connected to supply a correction pattern to the timing correction blocks. The timing correction blocks have a buffer connected to a multiplexor. The correction pattern controls whether the multiplexor receives an adjusted clock signal through the buffer to control whether the timing correction blocks supply an unadjusted clock signal or the adjusted clock signal to the latch components. The latch components hold the output data based the unadjusted clock signal or the adjusted clock signal before supplying the output data to the logic components of a subsequent pipeline stage.

Additional method embodiments herein manufacture an apparatus to include a series of pipeline stages having logic components connected to supply output data to latch components, timing correction blocks connected to the latch components, and a memory component connected to the timing correction blocks. Such methods supply test vectors to the apparatus (after manufacturing) to identify timing constraint violations. This allows these methods to identify timing changes to an unadjusted clock signal that is supplied to the latch components that resolve the timing constraint violations. These methods record the timing changes as a correction pattern in the memory component. The timing correction blocks are manufactured to have a buffer connected to a multiplexor. The correction pattern controls whether the multiplexor receives the unadjusted clock signal through the buffer to control whether the timing correction blocks supply an unadjusted clock signal or the adjusted clock signal to the latch components.

BRIEF DESCRIPTION OF THE DRAWINGS

The embodiments herein will be better understood from the following detailed description with reference to the drawings, which are not necessarily drawn to scale and in which.

DETAILED DESCRIPTION

As noted above, if the delays through the logic cells are too long, then the signals may violate setup time requirements, while if the delays through the logic cells are too short, then the signals may violate hold time requirements. Long paths and short paths behave inversely because paths with large positive setup slack are prone to hold violations and vice-versa. Similarly, fast corners are more prone to hold violations, while slow corners are more prone to setup violations. However, in near-threshold domains any or all corners may be critical for both setup and hold. Because of this, it is a tough challenge to meet both setup and hold requirements across all corners.

Modern systems-on-chip (SoCs) and application specific integrated circuits (ASICs) are precisely designed to avoid timing failures. However, if there is a hold or setup failure post-silicon (post-manufacture) even on a single register element, chip adjustments are required. To fix a hold or setup violation after a chip is fabricated, system frequency needs to be reduced (which decreases chip performance) or drain power voltage (VDD) supply needs to be raised (which increases power consumption). Failures are compounded at ultra-low VDD. Thus, it is useful to correct for setup or hold violations after fabrication without altering system frequency or power level.

The systems and methods herein address these issues by providing a circuit structure where the clock signal for each pipeline stage has a connection to a setup or hold correction block so that the delay selection can be scanned in separately for each pipeline stage. Therefore, the devices and methods described herein work at the post-manufacturing stage, the clock adjustment is applied on clock source points, and control block programing is able to affect a specific pipeline segment. With this, the methods and systems herein compensate for post-manufacturing setup violations using a clock shift block and programming method. This improves yield of silicon parts thereby saving costs and this has very minimal or no impact on area and the power of the chip.

Figure 1:
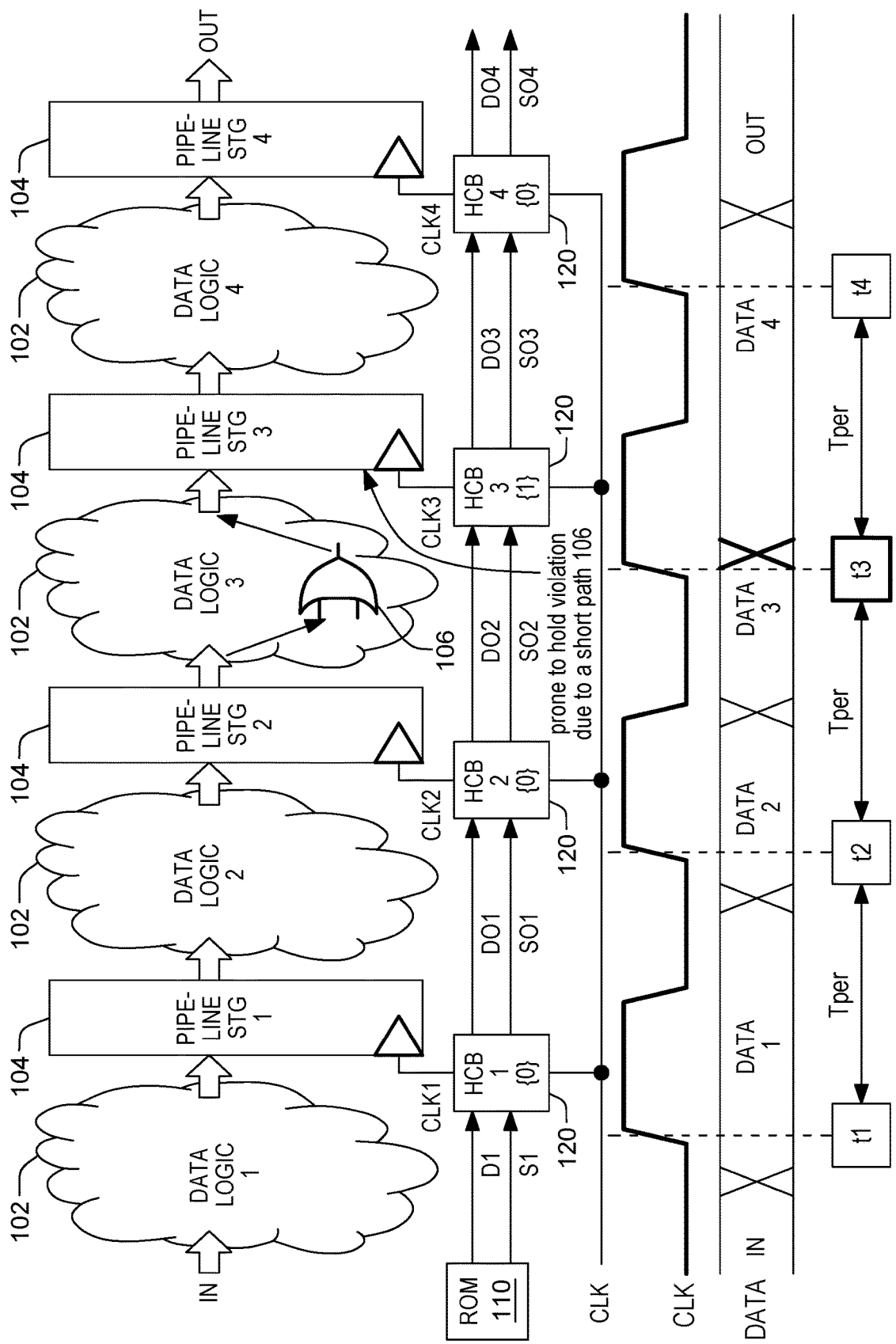
FIGS. 1-4 are schematic diagrams illustrating processing of data through pipelined logic stages according to embodiments herein.

FIG. 1 illustrates an exemplary apparatus herein that has a series of pipeline stages 102, 104. Each of the pipeline stages 102, 104 includes logic components 102 connected to receive input data and latch components 104. The logic components 102 are connected to supply output data to the latch components 104.

As shown in FIG. 1, timing correction blocks 120 (e.g., hold correction blocks (HCB1-HCB4) are connected to the latch components 104 and a memory component 110 (e.g., a read-only memory (ROM)). The timing correction blocks 120 receive an unadjusted clock signal CLK and supply either adjusted or unadjusted clock signals (CLK1-CLK4) to the individual pipeline stages 102, 104.

FIG. 1 also illustrates the waveform of the clock signal CLK and the timing of when data is supplied to the first pipeline stage and output by the logic components 102 of each pipeline stage (represented by "Xs" in FIG. 1) relative to the clock signal CLK waveform. The specific starting times (t1-t4) of the clock cycles are illustrated along with the time period length (Tper) of each clock cycle.

Figure 2:
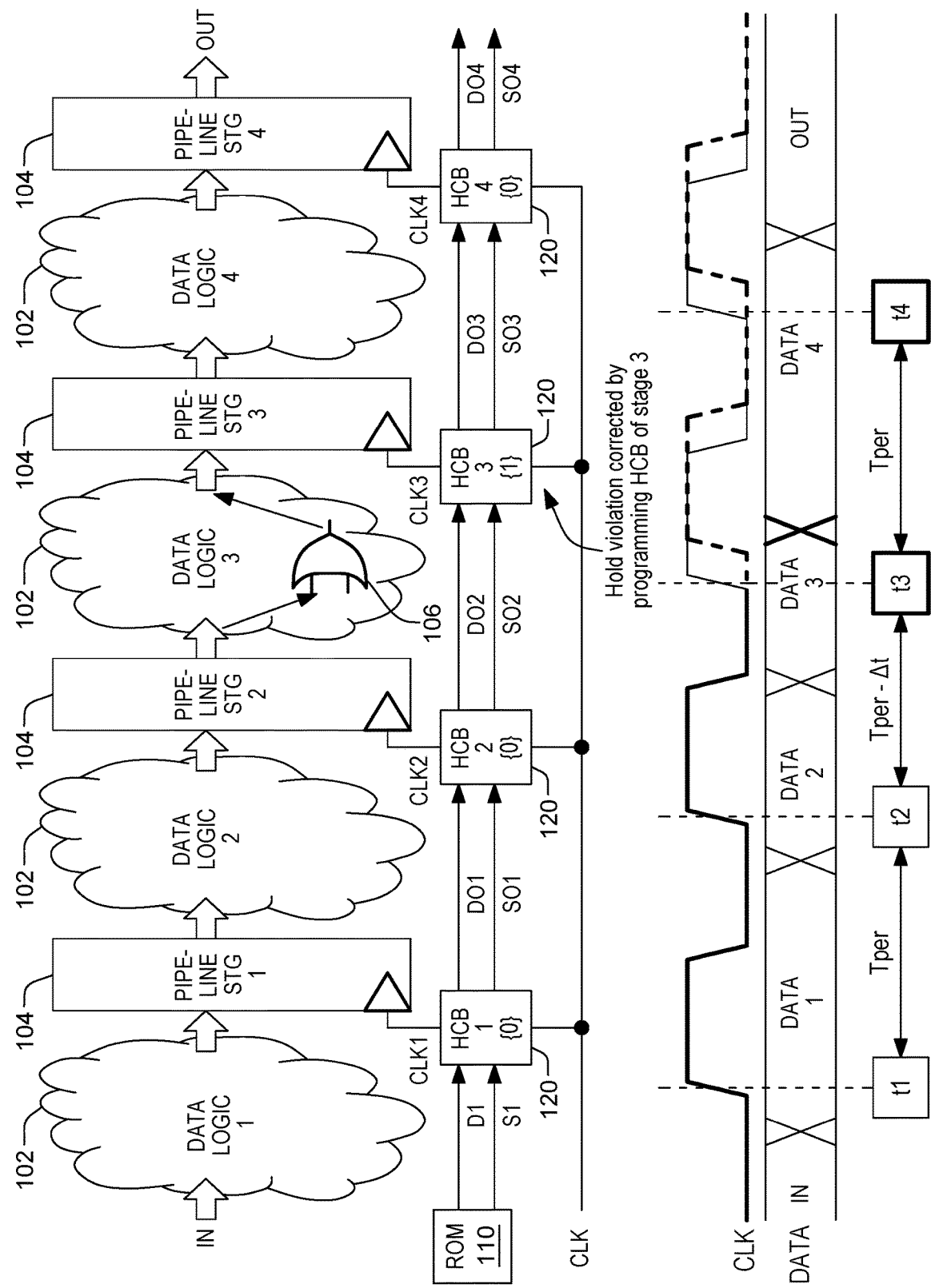

As shown in FIG. 1, a short path (represented by logic component graphic 106) is present in the data logic 102 of the third pipeline stage. As shown by the curved arrow and text, this short path 106 makes the third stage prone to hold violations. Indeed, the clock cycle after t3 shows two "X" demonstrating the hold violation caused by the short path 106. FIG. 2 illustrates how the devices and methods herein compensate for such a hold violation.

More specifically, FIG. 2 illustrates the same structure shown in FIG. 1; however, in FIG. 2, the timing correction block 120 (HCB3) for the third pipeline stage has a selection setting of {1} compared to a selection setting of {0} for the other pipeline stages. This selection setting {1} causes the timing correction block 120 (HCB3) for the third pipeline stage to advance the rising edge of the t3 clock cycle and this eliminates the hold violation. In FIG. 2, the solid line is the adjusted clock waveform while the broken line is the unadjusted clock waveform.

These solid and broken lines shown in FIG. 2 illustrate that advancing the rising edge of the t3 clock cycle shortens the time period between the t2 and t3 clock cycles (Tper-Δt) and advances both the t3 the t4 clock cycles. Specifically, the "S" signal line (S1, S01, S02, S03, etc.) supplies the correction pattern to each of the timing correction blocks 120 to control whether a given timing control block 120 will advance the clock cycle. The "D" signal line (D1, D01, D02, D03, etc.) supplies a signal to advance the clock cycle if any of the previous clock cycles were advanced (this is explained below in greater detail in the discussion of FIG. 5).

As also explained in greater detail below, the memory component 110 stores the correction pattern (in the example shown in FIG. 2 the correction pattern is "0010") that is scanned into the timing correction blocks 120 (e.g., HCB1{0}, HCB2{0}, HCB3{1}, HCB4{0}) each time the device initializes. As also explained below, the correction pattern is determined by testing the device post-manufacture.

Figure 3:
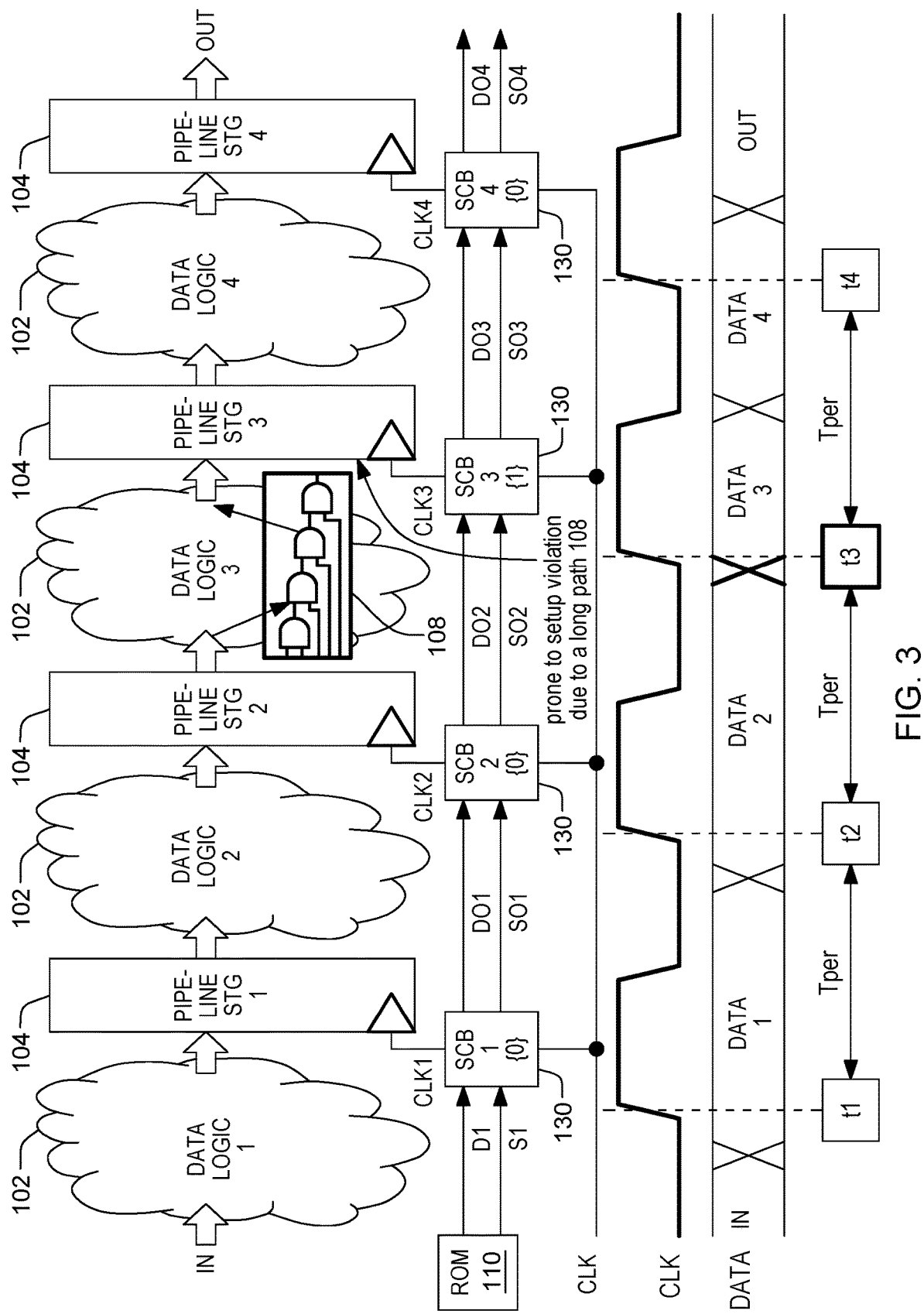
Figure 4:
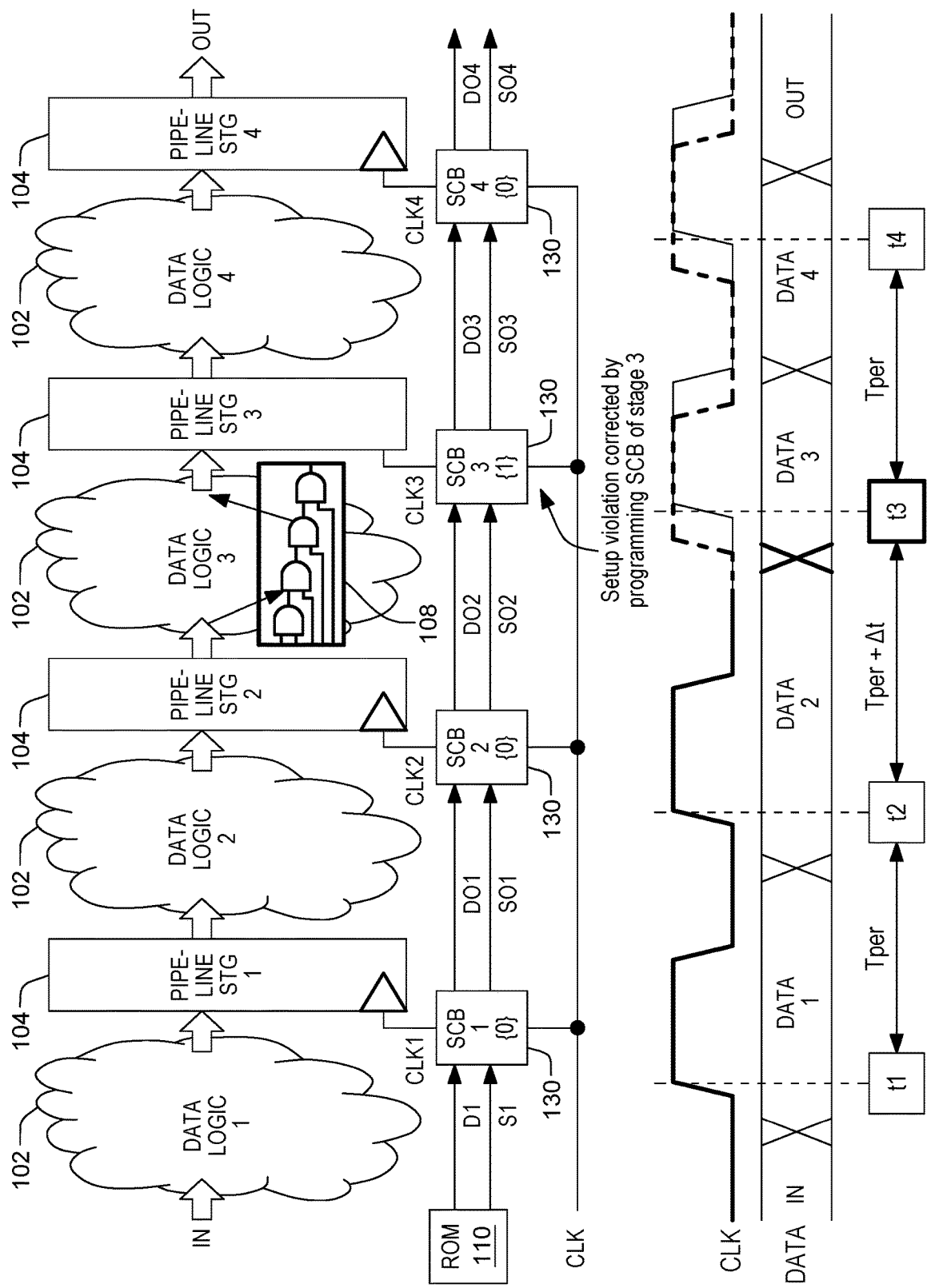

FIGS. 3 and 4 illustrate a similar structure to that shown in FIG. 1; however, rather than including timing control blocks 120 that are hold control blocks, FIGS. 3 and 4 illustrate setup control blocks 130 (SCB). As shown in FIG. 3, a long path (represented by logic component graphic 108) is present in the data logic 102 of the third pipeline stage. As shown by the curved arrow and text, this long path 108 makes the third stage prone to setup violations. Indeed, the clock cycle after t3 shows an "X" too late in the second clock cycle (t2) demonstrating the setup violation caused by the long path 108. FIG. 4 illustrates how the devices and methods herein compensate for such a setup violation. Note that while FIG. 2 shows that the adjusted clock signal CLK3 can be an advanced clock signal relative to the unadjusted clock signal CLK, FIG. 4 discussed below shows that the adjusted clock signal CLK3 can be a delayed clock signal relative to the unadjusted clock signal CLK.

More specifically, FIG. 4 illustrates the same structure shown in FIG. 3; however, in FIG. 4, the timing correction block 130 (SCB3) for the third pipeline stage has a selection setting of {1} compared to a selection setting of {0} for the other pipeline stages. This selection setting {1} causes the timing correction block 130 (SCB3) for the third pipeline stage to delay the rising edge of the t3 clock cycle and this eliminates the setup violation. Again, in FIG. 4 the solid line is the adjusted clock waveform while the broken line is the unadjusted clock waveform.

These solid and broken lines shown in FIG. 4 illustrate that delaying the rising edge of the t3 clock cycle lengthens the time period between the t2 and t3 clock cycles (Tper-Δt) and delays both the t3 the t4 clock cycles. Specifically, the "S" signal line (S1, S01, S02, S03, etc.) supplies the correction pattern to each of the timing correction blocks 130 to control whether a given timing control block 130 will delay the clock cycle. The "D" signal line (D1, D01, D02, D03, etc.) supplies a signal to advance the clock cycle if any of the previous clock cycles were delayed (this is explained below in greater detail in the discussion of FIG. 6).

As explained in greater detail below, the memory component 110 stores the correction pattern (in the example shown in FIG. 4 the correction pattern is "0010") that is scanned into the timing correction blocks 130 (e.g., SCB1{0}, SCB2 {0}, SCB3{1}, SCB4{0}) each time the device initializes. As also explained below, the correction pattern is determined by testing the device post-manufacture.

Thus, as shown in FIGS. 1-4, the apparatuses herein include a memory component 110 that is connected to supply a correction pattern to the timing correction blocks 120/130. The memory component 110 is a post-manufacturing programmable form of memory component 110. The timing correction blocks 120/130 are adapted to be programmed by the correction pattern received from the memory component 110 each time the apparatus is powered up.

Figure 5:
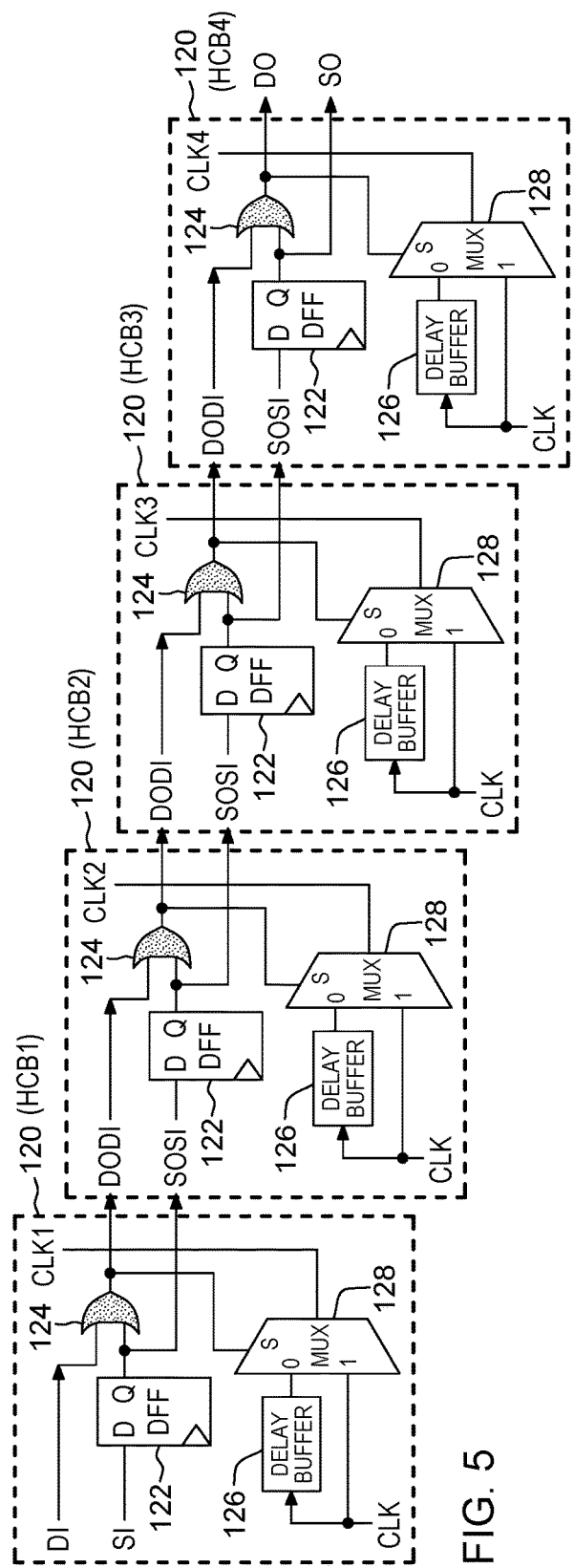
FIGS. 5-6 are schematic diagrams illustrating timing correction blocks according to embodiments herein.

FIG. 5 is an expanded view of just the hold timing correction blocks 120 shown in FIGS. 1 and 2 and FIG. 5 shows the components within timing correction blocks 120. Specifically, FIG. 5 illustrates that each hold timing correction block 120 has a delay buffer 126 connected to a multiplexor 128. The multiplexor 128 has a first clock input 1 connected to a clock component supplying the unadjusted clock signal CLK, a second clock input 0 connected to the delay buffer 126, and a select input S connected to a logical OR device 124. The delay buffer 126 is connected to the clock component (unadjusted clock CLK) and the second clock input 0. As shown in FIG. 5, a volatile memory device 122 temporarily stores the portion of the selection pattern (0 or 1) corresponding to each given timing correction block 120 that is supplied from the memory component 110 at initialization.

The correction pattern (0 or 1) controls whether the multiplexor 128 receives the unadjusted clock signal CLK or an adjusted clock signal through the delay buffer 126. This controls whether the timing correction blocks 120 supply the unadjusted clock signal CLK or the adjusted clock signal to the latch components 104.

In this example of a selection pattern 0010 presented in FIG. 2, an arbitrary 0 value supplied to the multiplexor by the OR device 124 causes the clock signal CLK to be delayed through the delay buffer 126 in the first two timing correction blocks 120 (HCB1 and HCB2). Specifically, the first two digits of the selection pattern 0010 are 0 and the initial D1 signal defaults to 0 in this example. Therefore, in the first two timing correction blocks 120 (HCB1 and HCB2) the OR device 124 receives two 0's and the OR device 124 outputs a 0 to the selection input S of the multiplexor. This results in the first two clock signals CLK1 and CLK2 being adjusted (delayed) as the 0 applied to the selector input S of the multiplexor 128 selects the 0 input connected to the delay buffer 126.

However, in the third timing control block 120 (HCB3), the volatile memory device 122 stores a 1 that is supplied to the OR device 124 causing the OR device 124 to output a 1 to the multiplexor 128 selection input S. This results in the third clock signal CLK3 being unadjusted as the 1 applied to the selector input S of the multiplexor 128 selects the 1 input connected to the unadjusted CLK signal. This results in the CLK3 signal being advanced relative to the delayed CLK1 and CLK2 clock cycles (as shown in FIG. 2 discussed above).

As shown in FIG. 5, the output of the OR device 124 in the previous timing control block 120 is supplied to the OR device 124 in the subsequent timing control block 120. Therefore, the OR device 124 in the fourth timing control block 120 (HCB4) receives a 1 from the previous OR device 124 in the third timing control block 120 (HCB3) and (according to this example of a 0010 selection pattern) receives a 0 from the volatile memory device 122. This causes the OR device 124 in the fourth timing control block 120 (HCB4) to output a 1 to the multiplexor 128 selection input S. This results in the fourth clock signal CLK4 being unadjusted as the 1 applied to the selector input S of the multiplexor 128 selects the 1 input connected to the unadjusted CLK signal. This results in the CLK4 signal also being advanced relative to the delayed CLK1 and CLK2 clock cycles (as shown in FIG. 2 discussed above).

Figure 6:
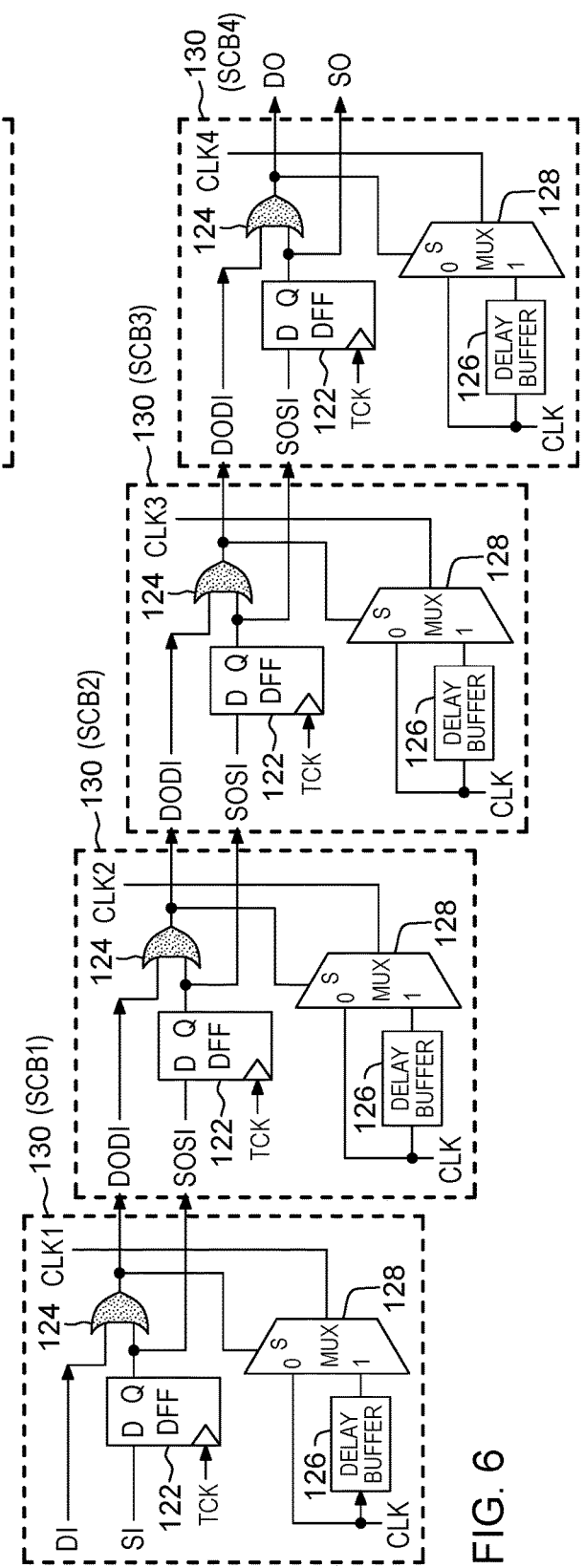

FIG. 6 is an expanded view of just the hold timing correction blocks 130 shown in FIGS. 3 and 4 and FIG. 6 shows the components within timing correction blocks 130. Specifically, FIG. 6 illustrates that each of the hold timing correction blocks 130 similarly have a delay buffer 126 connected to a multiplexor 128. Opposite the structure shown in FIG. 5, the multiplexor 128 shown in FIG. 6 has a first clock input 1 connected to the delay buffer 126, a second clock input 0 connected to the clock component supplying the unadjusted clock signal CLK, and a select input S connected to a logical OR device 124. The delay buffer 126 is connected to the clock component (unadjusted clock CLK) and the first clock input 1. As shown in FIG. 6, the same volatile memory device 122 temporarily stores the portion of the selection pattern (0 or 1) corresponding to each given timing correction block 130 that is supplied from the memory component 110 at initialization.

The correction pattern (0 or 1) controls whether the multiplexor 128 outputs the unadjusted clock signal CLK or the adjusted clock signal. This controls whether the timing correction blocks 130 supply the unadjusted clock signal CLK or the adjusted clock signal to the latch components 104.

In this example of a selection pattern 0010 presented in FIG. 4, an arbitrary 0 value supplied to the multiplexor by the OR device 124 causes the clock signal CLK to be passed through the multiplexor unadjusted in the first two timing correction blocks 130 (SCB1 and SCB2). Specifically, the first two digits of the selection pattern 0010 are 0 and the initial D1 signal defaults to 0 in this example. Therefore, in the first two timing correction blocks 130 (SCB1 and SCB2) the OR device 124 receives two 0's and the OR device 124 outputs a 0 to the selection input S of the multiplexor. This results in the first two clock signals CLK1 and CLK2 being unadjusted as the 0 applied to the selector input S of the multiplexor 128 selects the 0 input connected to the CLK input.

However, in the third timing control block 130 (SCB3), the volatile memory device 122 stores a 1 that is supplied to the OR device 124 causing the OR device 124 to output a 1 to the multiplexor 128 selection input S. This results in the third clock signal CLK3 being processed through the delay buffer 126 as the 1 applied to the selector input S of the multiplexor 128 selects the 1 input connected to the delay buffer 126. This results in the CLK3 signal being delayed relative to the unadjusted CLK1 and CLK2 clock cycles (as shown in FIG. 4 discussed above).

As shown in FIG. 6, the output of the OR device 124 in the previous timing control block 130 is again supplied to the OR device 124 in the subsequent timing control block 130. Therefore, the OR device 124 in the fourth timing control block 130 (SCB4) receives a 1 from the previous OR device 124 in the third timing control block 130 (SCB3) and (according to this example of a 0010 selection pattern) receives a 0 from the volatile memory device 122. This causes the OR device 124 in the fourth timing control block 130 (SCB4) to output a 1 to the multiplexor 128 selection input S. This results in the fourth clock signal CLK4 being delayed as the 1 applied to the selector input S of the multiplexor 128 selects the 1 input connected to the delay buffer 126. This results in the CLK4 signal also being delayed relative to the unadjusted CLK1 and CLK2 clock cycles (as shown in FIG. 4 discussed above).

Thus, the latch components 104 hold the output data based the unadjusted clock signal CLK or the adjusted clock signal before supplying the output data to the logic components 102 of a subsequent pipeline stage. Thus, the unadjusted clock signal CLK and the adjusted clock signal control the length of time the latch components 104 hold the output data before supplying the output data to the logic components 102 of a subsequent pipeline stage. Further, the timing correction blocks 120/130 are connected to supply the unadjusted clock signal CLK or the adjusted clock signal to subsequent correction blocks 120/130 in subsequent pipeline stages 102, 104.

Figure 7:
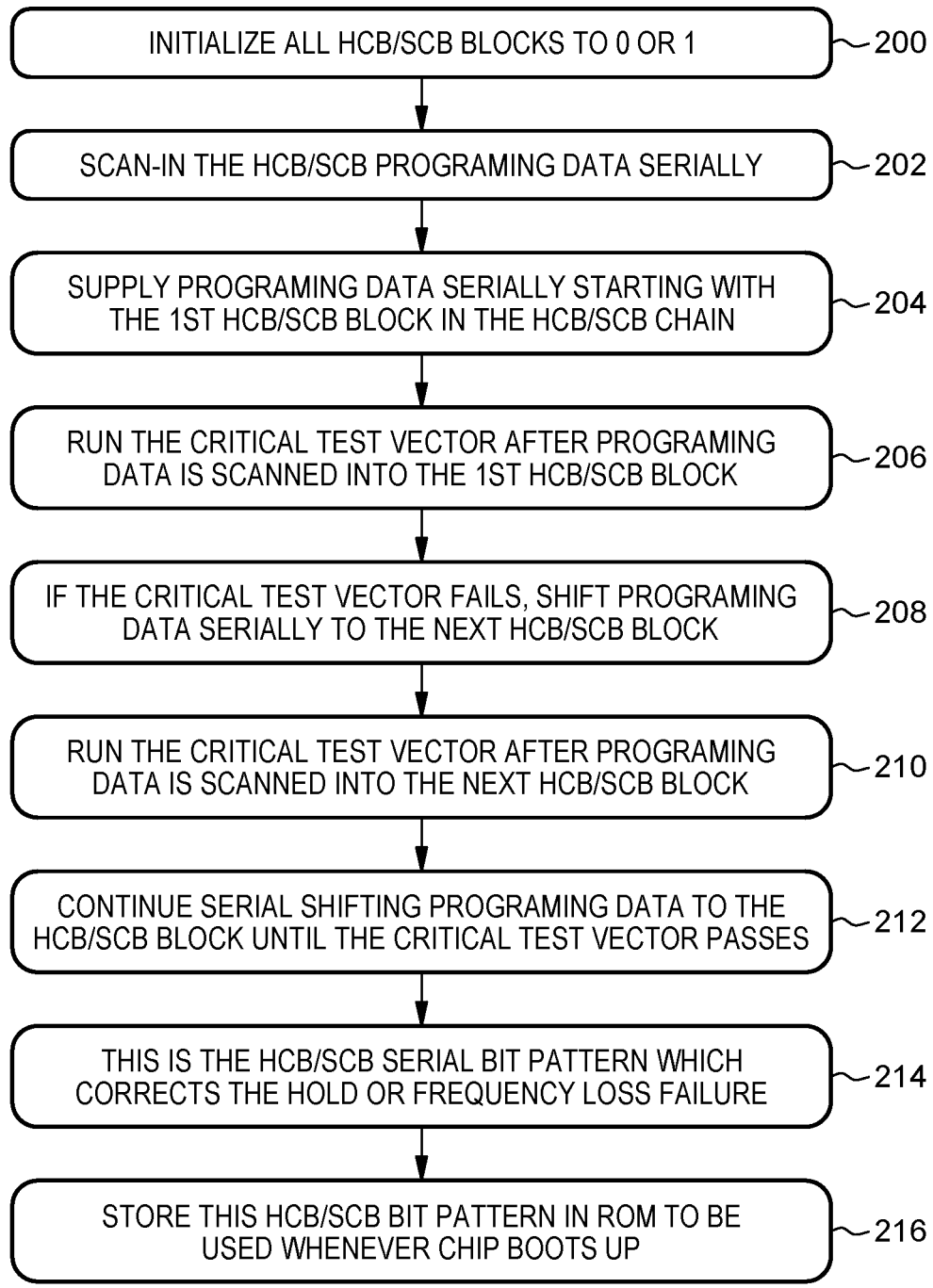
FIGS. 7-8 are flow diagrams illustrating embodiments herein.

FIG. 7 is a flowchart showing aspects of methods embodiments herein that determine the correction pattern that is stored in the memory component. Specifically, in item 200 all the HCB/SCB blocks are initialized. In some examples all the HCB/SCBs can be initialized to zero or one values (e.g., 1'b0) in item 200. In item 202 this processing obtains HCB/SCB programing data serially. In item 204, the programing data (e.g., a value opposite the initialization value such as 1'b1) is serially supplied to the multiplexors in the HCB/SCBs, starting with the first HCB/SCB block in the HCB/SCB chain.

Next, as shown in item 206, after the programing data is scanned into the first HCB/SCB block, this processing runs a critical test vector process. In item 208 if the critical test vector process fails in item 206, the processing shifts the programing data serially to the next HCB/SCB block. Then, after the programing data is scanned into the next HCB/SCB block, this processing repeats the critical test vector process in item 210.

Item 212 shows that this process of testing and shifting programing data to the next HCB/SCB block where the process continues serial shifting the programing data to the subsequent HCB/SCB blocks until the critical test vector passes. Item 214 shows that once the critical test vector passes in item 212 this results in the HCB/SCB serial bit pattern (correction pattern) which corrects the hold or frequency loss failure. In item 216 the correction pattern is stored in the memory component wherein the HCB/SCB bit pattern is stored (e.g., in ROM) allowing the correction pattern to be used whenever the chip boots up.

Figure 8:
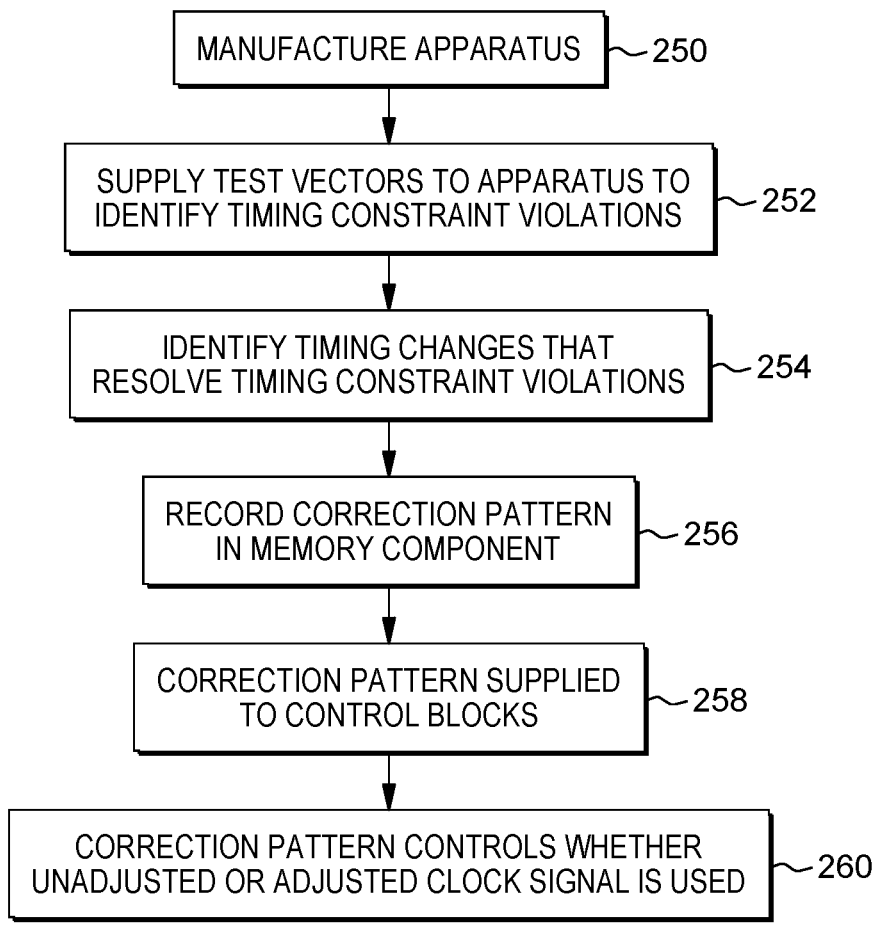

FIG. 8 is a flowchart showing aspects of method embodiments herein. As shown in item 250, these methods manufacture an apparatus to include a series of pipeline stages having logic components connected to supply output data to latch components, timing correction blocks connected to the latch components, and a memory component connected to the timing correction blocks. The timing correction blocks are manufactured in item 250 to have a buffer connected to a multiplexor.

The multiplexor is manufactured in item 250 to have a first clock input connected to a clock component supplying the unadjusted clock signal, a second clock input connected to the buffer, and a select input connected to receive the correction pattern from the memory component. The buffer is connected to the clock component and the second clock input. The memory component is manufactured in item 250 to be a post-manufacturing programmable form of memory component. The timing correction blocks are manufactured in item 250 to be programmed by the correction pattern received from the memory component each time the apparatus is powered up. The timing correction blocks are manufactured in item 250 to be connected to supply the unadjusted clock signal or the adjusted clock signal to subsequent correction blocks in subsequent pipeline stages.

As shown in item 252, such methods supply test vectors to the apparatus (after manufacturing) to identify timing constraint violations. This allows these methods to identify timing changes to an unadjusted clock signal that is supplied to the latch components that resolve the timing constraint violations in item 254. These methods record the timing changes as a correction pattern in the memory component in item 256.

At apparatus initialization (startup, boot-up, power-up, etc.) the correction pattern recorded in item 256 is supplied to the multiplexor select port in the control blocks in item 258 to control whether the multiplexor receives an adjusted clock signal through the buffer, and this in turn controls whether the timing correction blocks supply an unadjusted clock signal or the adjusted clock signal to the latch components in item 260. The adjusted clock signal can be a delayed clock signal relative to the unadjusted clock signal for hold control blocks or an advanced clock signal relative to the unadjusted clock signal for setup control blocks.

The terminology used herein is for the purpose of describing particular embodiments only and is not intended to be limiting of the foregoing. As used herein, the singular forms "a," "an," and "the" are intended to include the plural forms as well, unless the context clearly indicates otherwise.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. An apparatus comprising: a series of pipeline stages comprising: logic components connected to supply output data to latch components and timing correction blocks connected to the latch components; and a memory component connected to supply a correction pattern to the timing correction blocks, wherein each pipeline stage includes a logic component, a latch component connected to the logic component, and a timing correction block connected to the latch component, wherein the timing correction blocks comprises: a multiplexor comprising: a first clock input; and a second clock input; and a buffer connected to the second clock input, wherein the buffer and the first clock input are connected to receive an unadjusted clock signal, wherein the second clock input is connected to receive an adjusted clock signal from the buffer, and wherein the correction pattern controls the multiplexor to control whether the timing correction blocks supplies one of the unadjusted clock signal and the adjusted clock signal to the latch components.

2. The apparatus according to claim 1, wherein the adjusted clock signal comprises one of a delayed clock signal relative to the unadjusted clock signal and an advanced clock signal relative to the unadjusted clock signal.

3. The apparatus according to claim 1,
wherein the first clock input is connected to a clock component supplying the unadjusted clock signal,
wherein the second clock input is connected to the buffer,
wherein the buffer is connected to the clock component and the second clock input, and
wherein the multiplexor further comprises a select input connected to receive the correction pattern from the memory component.

4. The apparatus according to claim 1, wherein the memory component comprises a post-manufacturing programmable form of memory component.

5. The apparatus according to claim 1, wherein the timing correction blocks are adapted to be programmed by the correction pattern received from the memory component each time the apparatus is powered up.

6. The apparatus according to claim 1, wherein the timing correction blocks are connected to supply one of the unadjusted clock signal and the adjusted clock signal to subsequent correction blocks in subsequent pipeline stages.

7. The apparatus according to claim 1, wherein the unadjusted clock signal and the adjusted clock signal control a length of time the latch components hold the output data before supplying the output data to the logic components of a subsequent pipeline stage.

8. An apparatus comprising:
a series of pipeline stages, wherein the pipeline stages comprise:
logic components connected to receive input data;
latch components, wherein the logic components are connected to supply output data to the latch components; and
timing correction blocks connected to the latch components, respectively; and
a memory component connected to supply a correction pattern to the timing correction blocks,
wherein each pipeline stage includes a logic component, a latch component connected to the logic component, and a timing correction block connected to the latch component,
wherein the timing correction blocks comprises:
a multiplexor comprising a first clock input; and a second clock input; and
a buffer connected to the second clock input,
wherein the buffer and the first clock input are connected to receive an unadjusted clock signal,
wherein the second clock input is connected to receive an adjusted clock signal from the buffer, and
wherein the correction pattern controls the multiplexor to control whether the timing correction blocks supplies one of the unadjusted clock signal and the adjusted clock signal to the latch component, and
wherein the latch component holds the output data based on the one of the unadjusted clock signal and the adjusted clock signal before supplying the output data to the logic component of a subsequent pipeline stage.

9. The apparatus according to claim 8, wherein the adjusted clock signal comprises one of a delayed clock signal relative to the unadjusted clock signal and an advanced clock signal relative to the unadjusted clock signal.

10. The apparatus according to claim 8,
wherein the first clock input is connected to a clock component supplying the unadjusted clock signal,
wherein the second clock input is connected to the buffer,
wherein the buffer is connected to the clock component and the second clock input, and
wherein the multiplexor further comprises a select input connected to receive the correction pattern from the memory component.

11. The apparatus according to claim 8, wherein the memory component comprises a post-manufacturing programmable form of memory component.

12. The apparatus according to claim 8, wherein the timing correction blocks are adapted to be programmed by the correction pattern received from the memory component each time the apparatus is powered up.

13. The apparatus according to claim 8, wherein the timing correction blocks are connected to supply one of the unadjusted clock signal and the adjusted clock signal to subsequent correction blocks in subsequent pipeline stages.

14. The apparatus according to claim 8, wherein the unadjusted clock signal and the adjusted clock signal control a length of time the latch components hold the output data before supplying the output data to the logic components of a subsequent pipeline stage.

15. A method comprising:
manufacturing an apparatus to include a series of pipeline stages comprising logic components connected to supply output data to latch components, timing correction blocks connected to the latch components, and a memory component connected to the timing correction blocks;
supplying test vectors to the apparatus after the manufacturing to identify timing constraint violations;
identifying timing changes to an unadjusted clock signal supplied to the latch components that resolve the timing constraint violations; and
recording the timing changes as a correction pattern in the memory component,
wherein each pipeline stage is manufactured to include: a logic component, a latch component connected to the logic component, and a timing correction block connected to the latch component,
wherein the timing correction block comprises:
a multiplexor comprising: a first clock input; and a second clock input; and
a buffer connected to the second clock input,
wherein the buffer and the first clock input are connected to receive an unadjusted clock signal,
wherein the second clock input is connected to receive an adjusted clock signal from the buffer, and
wherein the correction pattern controls the multiplexor to control whether the timing correction blocks supplies one of the unadjusted clock signal and the adjusted clock signal to the latch components.

16. The method according to claim 15, wherein the adjusted clock signal comprises one of a delayed clock signal relative to the unadjusted clock signal and an advanced clock signal relative to the unadjusted clock signal.

17. The method according to claim 15,
wherein the first clock input is connected to a clock component supplying the unadjusted clock signal,
wherein the second clock input is connected to the buffer,
wherein the buffer is connected to the clock component and the second clock input, and
wherein the multiplexor further includes a select input connected to receive the correction pattern from the memory component.

18. The method according to claim 15, wherein the memory component is manufactured to comprise a post-manufacturing programmable form of memory component.

19. The method according to claim 15, wherein the timing correction blocks are manufactured to be programmed by the correction pattern received from the memory component each time the apparatus is powered up.

20. The method according to claim 15, wherein the timing correction blocks are manufactured to be connected to supply one of the unadjusted clock signal and the adjusted clock signal to subsequent correction blocks in subsequent pipeline stages.

* * * * *